United States Patent [19]
Martin-Cocher et al.

[11] Patent Number: 5,953,888
[45] Date of Patent: Sep. 21, 1999

[54] PRE-STRETCHED FILM, AND APPARATUS AND METHOD FOR OUTER PACKAGING

[75] Inventors: Jean-Paul Martin-Cocher, La Motte Servolex; Jaconelli Georges, Brison Saint Innocent, both of France

[73] Assignee: Thimon, S.A., France

[21] Appl. No.: 09/000,887

[22] Filed: Dec. 30, 1997

Related U.S. Application Data

[62] Division of application No. 08/766,251, Dec. 13, 1996, Pat. No. 5,797,246.

[30] Foreign Application Priority Data

Dec. 13, 1995 [FR] France .................................... 9514757

[51] Int. Cl.$^6$ ...................................................... B65B 53/00
[52] U.S. Cl. ............................................... 53/556; 425/66
[58] Field of Search ........................... 53/399, 441, 556; 264/288.4; 425/66

[56] References Cited

U.S. PATENT DOCUMENTS

| | | |
|---|---|---|
| 3,517,098 | 6/1970 | Rasmussen . |
| 3,799,715 | 3/1974 | Miura . |
| 5,090,182 | 2/1992 | Bethge . |
| 5,195,296 | 3/1993 | Matsumoto . |
| 5,195,297 | 3/1993 | Lancaster et al. . |
| 5,307,609 | 5/1994 | Kurata et al. . |
| 5,458,841 | 10/1995 | Shirrell . |

FOREIGN PATENT DOCUMENTS

| | | |
|---|---|---|
| 0 338 747 | 10/1989 | European Pat. Off. . |
| 0 342 914 | 11/1989 | European Pat. Off. . |
| 34 09 117 | 9/1985 | Germany . |
| 6-80110 | 3/1994 | Japan . |

*Primary Examiner*—Linda Johnson
*Attorney, Agent, or Firm*—Schwartz & Weinbrieb

[57] ABSTRACT

The present invention relates to a pre-stretched film, and to apparatus and a method of applying outer packaging to packages and to loads, optimized as a function of the structure and in particular the shape of the package or the load, in particular a palletized load, and also as a function of the transport and handling that the package or the load must be capable of withstanding without the outer packaging being dislocated. According to the invention, a stretchable film is stretched over at least one roller having a diameter that varies along its axis of rotation so as to form parallel longitudinal zones in the film that have different degrees of stretching. These zones make it possible, in particular, to track the external outlines of objects to be packaged and/or to provide locally-reinforced bonding, or on the contrary to present surfaces that are more relaxed. The present invention applies in particular to packaging and grouping together loads that may optionally be palletized. The main application of the present invention lies in grouping together bottles of beverages.

23 Claims, 4 Drawing Sheets

PRE-STRETCHED FILM, AND APPARATUS AND METHOD FOR OUTER PACKAGING

This patent application is a Divisional patent application of prior patent application Ser. No. 08/766,251 filed Dec. 13, 1996, now U.S. Pat. No. 5,797,246.

FIELD OF THE INVENTION

The present invention relates to a pre-stretched film, and to apparatus and a method for the outer packaging of packages and loads optimized as a function of structure, in particular the shape of the package or the load, particularly a palletized load, and as a function of the transport and handling that the package or the load must be capable of withstanding without dislocation of its outer packaging.

BACKGROUND OF THE INVENTION

Transport, handling, and the grouping together of palletized loads or packages may require outer packaging to protect the package or the load and to ensure cohesion thereof. Outer packaging is conventionally performed using a film that is stretchable or heat shrinkable.

The high price of outer packaging film commonly constitutes a significant percentage of the cost price of outer packaging. Also, it has been observed that with conventional type outer packaging any dislocation of the outer packaging always take place at the same locations, for example where it is folded under a pallet to secure the outer packaging.

OBJECTS AND SUMMARY OF THE INVENTION

Consequently, an object of the present invention is to provide an outer packaging method that provides effective protection of outer-packaged loads.

Another object of the present invention is to provide an outer packaging method that ensures good cohesion of loads during transport, storage, and handling.

Another object of the present invention is to provide such a method that uses small quantities of film.

It is also an object of the present invention to provide a method enabling outer packaging to be used that is attractive.

It is also an object of the present invention to offer a method enabling the outer packaging to be adapted to the shape of the load that is to receive it.

It is also an object of the present invention to offer outer packaging that is reinforced at the locations subject to greatest stress during transport, storage, or handling of the load.

According to the invention, these objects are achieved by stretching a stretchable film over at least one roller that has a diameter that varies along its axis of rotation, in such a manner as to form parallel longitudinal zones in the film having different degrees of stretching. These zones make it possible in particular to follow the external outlines of objects to receive the outer packaging and/or to provide locally reinforced binding, or on the contrary to provide surfaces that exhibit slack.

The invention mainly provides apparatus for stretching a stretchable film, the apparatus comprising drive means, a first rotary roller rotated by the drive means at a first tangential peripheral speed, and a second rotary roller rotated by the drive means at a second tangential peripheral speed greater than the first tangential peripheral speed, wherein the diameter of the second roller varies along its axis of rotation so as to form longitudinal zones in the film having different degrees of stretching.

The invention also provides apparatus, wherein the axial variation in the diameter of the second roller is such as to induce an elongation ratio of the most stretched longitudinal zone with respect to the least stretched longitudinal zone lying in the range of 1.1 to 2, preferably in the range of 1.3 to 1.6, and preferably substantially equal to 1.5.

The invention also provides a spool of pre-stretched film, including longitudinal zones having degrees of stretching corresponding to various return forces likely to be exerted by the film on a load.

The invention also provides a spool, wherein the elongation ratio of the most stretched longitudinal zone with respect to the least stretched longitudinal zone lies in the range of 1.1 to 2, preferably in the range of 1.3 to 1.6, and preferably is substantially equal to 1.5.

The invention also provides a method of applying outer packaging to an optionally palletized load by placing a stretchable film around the load, wherein the film placed around the load has longitudinal zones presenting different degrees of stretching.

The invention also provides a method, wherein a pre-stretched film is used in which the longitudinal zones having different degrees of stretching are already formed.

The invention also provides a method including a step of stretching the film to form the longitudinal zones having different degrees of stretching that takes place simultaneously with the step of placing the film on the load.

The invention also provides a method comprising a succession of cycles, each cycle comprising the following steps:

stretching a length of film required for applying outer packaging to a single load, winding the length of film onto a transfer roller and cutting the film to length; and unwinding the stored film from the transfer roller and placing it on a load.

The invention also provides a method, wherein outer packaging is applied to a load that is palletized.

The invention also provides a method, wherein a margin of film corresponding to a longitudinal zone exhibiting the least degree of stretching is put into place beneath the pallet.

The invention also provides a method, wherein the film has narrow zones exhibiting a large return force in the range of 1.5 daN to 3 daN, and wider zones exhibiting a smaller return force lying in the range 0.5 daN to 1 daN.

The invention also provides a method, wherein outer packaging is applied to a palletized load including a plurality of layers, in particular layers of bottles, and wherein at least one narrow longitudinal zone exhibiting a large return force is applied horizontally around each layer.

The invention also provides a method for grouping bottles together, in particular in groups of six, wherein the film has a central zone corresponding to the width or preferably to the length of the group of bottles to be made up, and two less-stretched lateral zones covering at least in part the outside faces of the bottles located at the ends of the group of bottles.

The invention also provides a method, wherein the zones exhibiting a lower degree of stretching include perforations enabling the packaged load to be ventilated.

BRIEF DESCRIPTION OF THE DRAWINGS

The invention will be better understood from the following description and the accompanying drawings given as non-limiting examples, in which: like reference characters designated like corresponding parts through-out the several views, and wherein.

DETAILED DESCRIPTION OF THE ILLUSTRATED EMBODIMENTS

The invention consists in stretching a stretchable film, in particular a polyethylene film, from example by means of stretching rollers of a shape that is determined by the shape of the load that is to receive the outer packaging, and also by the stresses which the outer packaging must be capable of applying to the load in order to ensure cohesion thereof during transport, handling, and storage. In a first variant embodiment, the film is stretched as it is put into place on the load. In that case, it is preferable to subject the film, on its path between the stretching roller that pre-stretches it and its point of application to the load, to a certain amount of relaxation prior to the film being applied to the load.

Advantageously, the film is stretched and then stored on a reel or a spool in the pre-stretched state in order to allow it to relax. Relaxing a film after it has been stretched consists in reducing the mechanical tension in a film that is held under mechanical tension, for example wound on a reel or a load, or in reducing the elongation of unwound film. Conventional polyethylene film becomes completely stabilized within 48 hours. After being relaxed, a film is less elastic and less deformable. Advantageously the storage reel or spool has a profile analogous to that of the roller 7 used for performing pre-stretching.

In a variant, the pre-stretched film is stored directly for relaxation purposes on the roller 7 that is used for stretching the film. The film is applied to the load that is to receive the outer packaging only after a predetermined relaxation time has elapsed, which time may lie in the range of a few seconds to several hours or even more. Application is advantageously performed by unwinding the pre-stretched film from the roller or the reel on which the film has been relaxed. The mechanical tension in the film is released, conserved, or increased, for example, by brake means for the roller or the reel, which brake means are advantageously adjustable.

The relaxation step may optionally be followed by storing the stabilized film. This technique of anticipated stretching is described in U.S. Ser. No. 08/417,097 and U.S. Ser. No. 08/387,711 which are incorporated herein by reference.

In a variant, the quantity of film required for the outer packaging of a package is stretched and stored for a predetermined period of time lying in the range a fraction of a second to several seconds on a transfer roller prior to being applied to the package.

Figure 1:
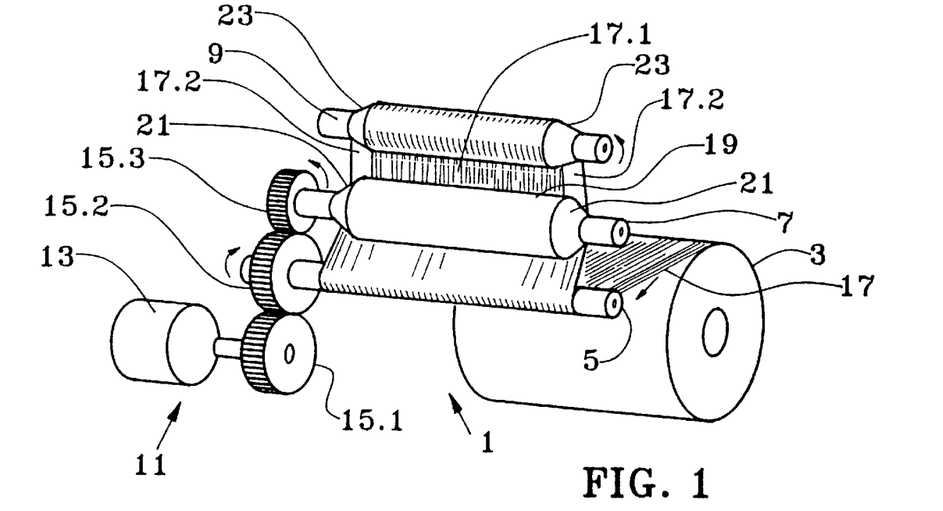
FIG. 1 is a perspective view of apparatus of the invention for pre-stretching film.

FIG. 1 shows pre-stretching apparatus 1 of the present invention comprising a reel 3 of stretchable film, a deflection roller 5, a stretching roller 7 that is stepped, that is, is of varying diameter, and a spool 9 for storage and/or transfer. Drive means 11 for example comprising an electric motor 13 and a step-down gear train 15.1, 15.2, and 15.3 serves to rotate the rollers 5 and 7 at different tangential peripheral speeds for stretching the film 17 coming from the reel 3. In the example shown in FIGS. 1 and 2, the stretching roller 7 comprises a cylinder 19 terminated at each of its ends by truncated cones 21. The cylinder 19 performs normal stretching of the film 17 in a longitudinal zone 17.1, whereas the truncated cones 21 provide less stretching in the zones 17.2 of the film. Zero elongation corresponds to the film prior to stretching, whereas an elongation of 100% corresponds to the length of the film being doubled. The tension in the less-stretched longitudinal zones of the film 17, after relaxation, lies in the range of 1 daN/MM$^2$ to 5 daN/mm$^2$, and preferably in the range of 1.5 daN/mm$^2$ to 3 daN/mm$^2$. The tension in the more-stretched longitudinal zones of the film 17, after relaxation, lies in the range of 0 to 2 daN/mm$^2$, and preferably in the range of 0.5 daN/mm$^2$ to 1 daN/mm$^2$. The elongation lies in the range of 50% to 500%, for example, and preferably in the range of 100% to 300%. The difference in elongation between the various zones of longitudinal stretching performed by the stretch roller 7 advantageously lies in the range of 10% to 100% in absolute value, for example being equal to 50%. In all cases, it is advantageous to work in the plastic deformation range of the film 17 so that after relaxation the film exerts an elastic return force. In one embodiment, the stretching performed by the truncated cones 21 lies in the range of 150% to 200%, whereas the stretching obtained by the cylinder 19 gives rise to an elongation equal to 200%.

Advantageously, the storage spool 9 includes chamfered portions 23, in particular frustoconical portions, to accommodate not only the elongation of the film but also the increase in film thickness in its margins due to the film creeping during stretching and to the lesser degree of stretching applied to the margins of the film by the truncated cones 21.

Figure 3:
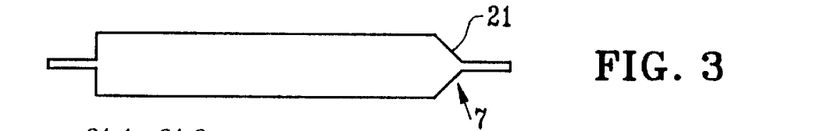
FIG. 3 is a side view of a second example of a pre-stretching roller suitable for use in the apparatus of FIG. 1.

FIG. 3 shows a second embodiment of a stretching roller of the present invention that has only one truncated cone 21 forming a single longitudinal zone of reduced stretching.

Figure 4:
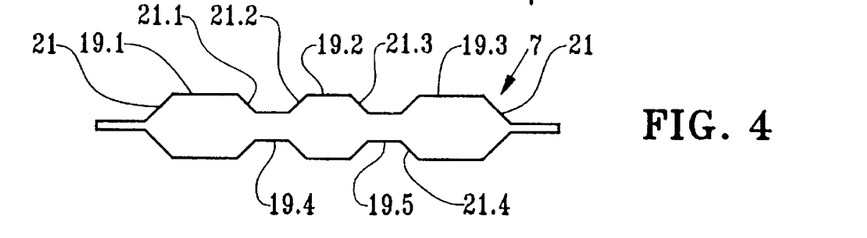
FIG. 4 is a side view of a third example of a pre-stretching roller suitable for use in the apparatus of FIG. 1.

FIG. 4 shows a third embodiment of a stretching roller 7 of the present invention comprising three cylinders 19.1, 19.2, and 19.3 of a first diameter which are spaced apart by two cylinders 19.4 and 19.5 of a second diameter smaller than the first diameter. Advantageously a frustoconical element 21.1 ensures a smooth transition between the cylinder 19.1 and the cylinder 19.4, a frustoconical element 21.2 provides a smooth transition between the cylinder 19.4 and the cylinder 19.2, a frustoconical element 21.3 provides a smooth transition between the cylinder 19.2 and the cylinder 19.5, and a frustoconical element 21.4 provides a smooth transition between the cylinder 19.5 and the cylinder 19.3.

Figure 2:
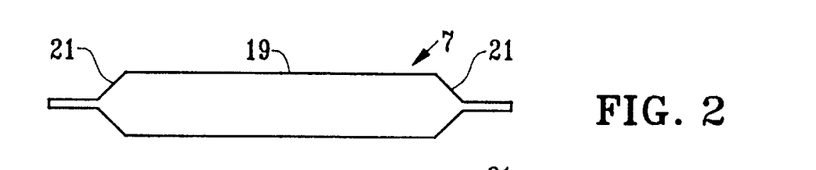
FIG. 2 is a side view of a first example of a pre-stretching roller suitable for use in the apparatus of FIG. 1.
Figure 5:
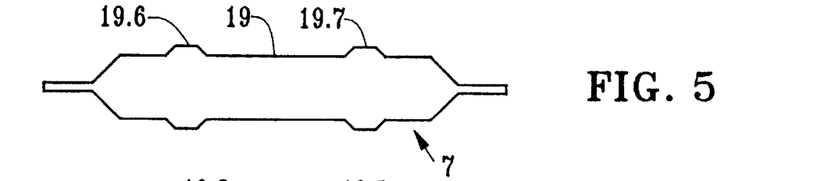
FIG. 5 is a side view of a fourth example of a pre-stretching roller suitable for use in the apparatus of FIG. 1.

FIG. 5 shows a fourth embodiment of a roller 7 of the present invention which differs from the roller 7 of FIG. 2 in that it has two cylindrical annular portions or annuli 19.6 and 19.7 of a third diameter greater than the first diameter.

Figure 6:
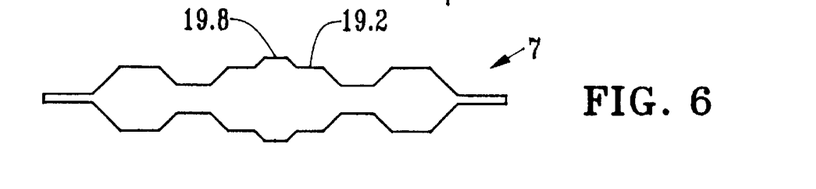
FIG. 6 is a side view of a fifth example of a pre-stretching roller suitable for use in the apparatus of FIG. 1.

FIG. 6 shows a fifth embodiment of a roller 7 of the present invention which differs from the roller 7 of FIG. 4 by the presence in the middle of the central cylinder 19.2 of a ring or cylinder 19.8 of a third diameter greater than the first diameter of the cylinder 19.2.

Figure 7:
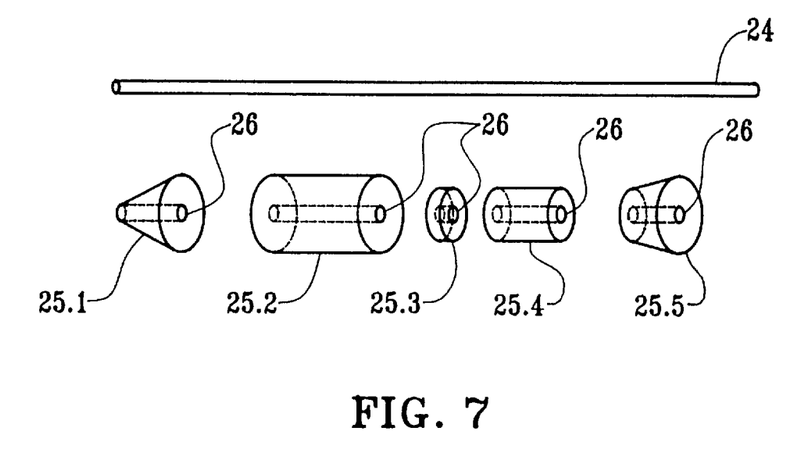
FIG. 7 is a perspective view of various modular roller elements suitable for making up rollers of various profiles.

The rollers shown in FIGS. 2 to 6 are of fixed configuration that is generally adapted to a single shape of load that is to receive outer packaging. In contrast, FIG. 7 shows various shapes of modular elements suitable for making up a roller 7 that can be adapted to various load configurations. Such a roller may be built up by threading bodies of revolution each having a central bore 26 on a shaft 24. For example, it is possible to use cones 25.1, cylinders 25.2 of a first diameter, cylinders 25.4 of a different diameter, for example smaller than the diameter of the cylinders 25.2 in the example shown, washers or cylinders 25.3 of the same diameter as the cylinders 25.4 but of shorter axial extent, and truncated cones 25.5. To make up a roller 7 of a desired configuration, an appropriate number, order, and orientation of the various elements are selected. The elements are threaded onto the shaft 24 and held in place by means of a suitable device, not shown.

Figure 8:
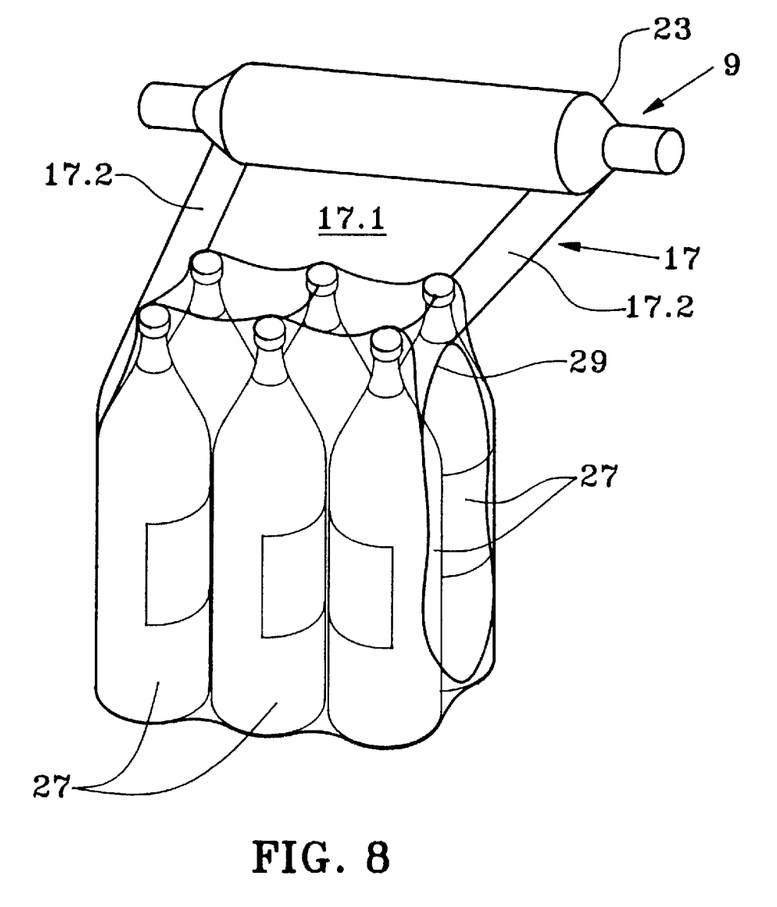
FIG. 8 is a perspective view of a pack of six beverage bottles having outer packaging applied thereto.

FIG. 8 shows outer packaging on a pack of six bottles 27, the packaging being constituted by a film 17 stretched by means of the apparatus of FIG. 1. The width of the film 17 is equal to or slightly greater than the width of three bottles disposed in two rows of three bottles each. The end of the film is initially fixed to the first row, for example by using a film that is slightly sticky, or by using adhesive or heat sealing. In a variant, the end of the film is pressed against the bottles by a clamp until the beginning of the second layer of film has been wound thereover thus holding the end in place after the clamp has been removed. Thereafter at least one and preferably several layers of film 17 are wound around the six bottles. The margins 17.2 of the film 17 that have been less stretched by the truncated cones 21 present a greater elastic return force and fit closely over the sides of the end bottles in the first and second rows, thereby providing better cohesion to the "six-pack" of bottles 27 constituted in this way.

At each two-bottle end of the pack there remains an opening 29 that is free of film and that provides a saving in stretchable film. For beverage packs that do not have a handle, the openings 29 run the risk of being used by consumers for grasping and handling the packs. It should be observed that the film in the zone 17.1, that is over the necks of the bottles 27 where the fingers are naturally positioned, is more highly stretched and therefore less tensed than is the film in the less stretched zones 17.2, and they therefore present good resistance to perforation by the fingers.

The method of the present invention thus makes it possible to ensure better cohesion of the load while using a smaller quantity of film.

A particularly effective machine of the invention for grouping together bottles or the like at a high rate of operation comprises the film stretching apparatus of FIG. 1 and means for depositing stretched film around the bottles. Advantageously, the quantity of film required for packaging the group that is to be made up, for example about 4 meters (m), is stretched and rolled onto the transfer roller 9. Means, not shown, cut the film whose end is fixed to the bottles. Relative movement between the bottles and the transfer roller 9 ensures that the film 17 is wound around the bottles, and braking means impart the desired mechanical tension to the film 17. Although the implementation of the means for rotating the bottles does not go beyond the ambit of the present invention, it has been found advantageous to use means for driving the roller 9 around the bottles and including a guide ring disposed in a vertical plane. In a particularly simple embodiment, the transfer roller 9 rotates around the ring at constant angular velocity, with variations in the film payout speed being accommodated by the partially relaxed stretched film (the relaxation typically occurring over one to several seconds) which is less difficult to achieve and more easily deformable. It should be observed that a greater-stretched zone at the bottle necks exerts a moderate force limiting any risk of the film being perforated.

Figures 9, 10, 11:
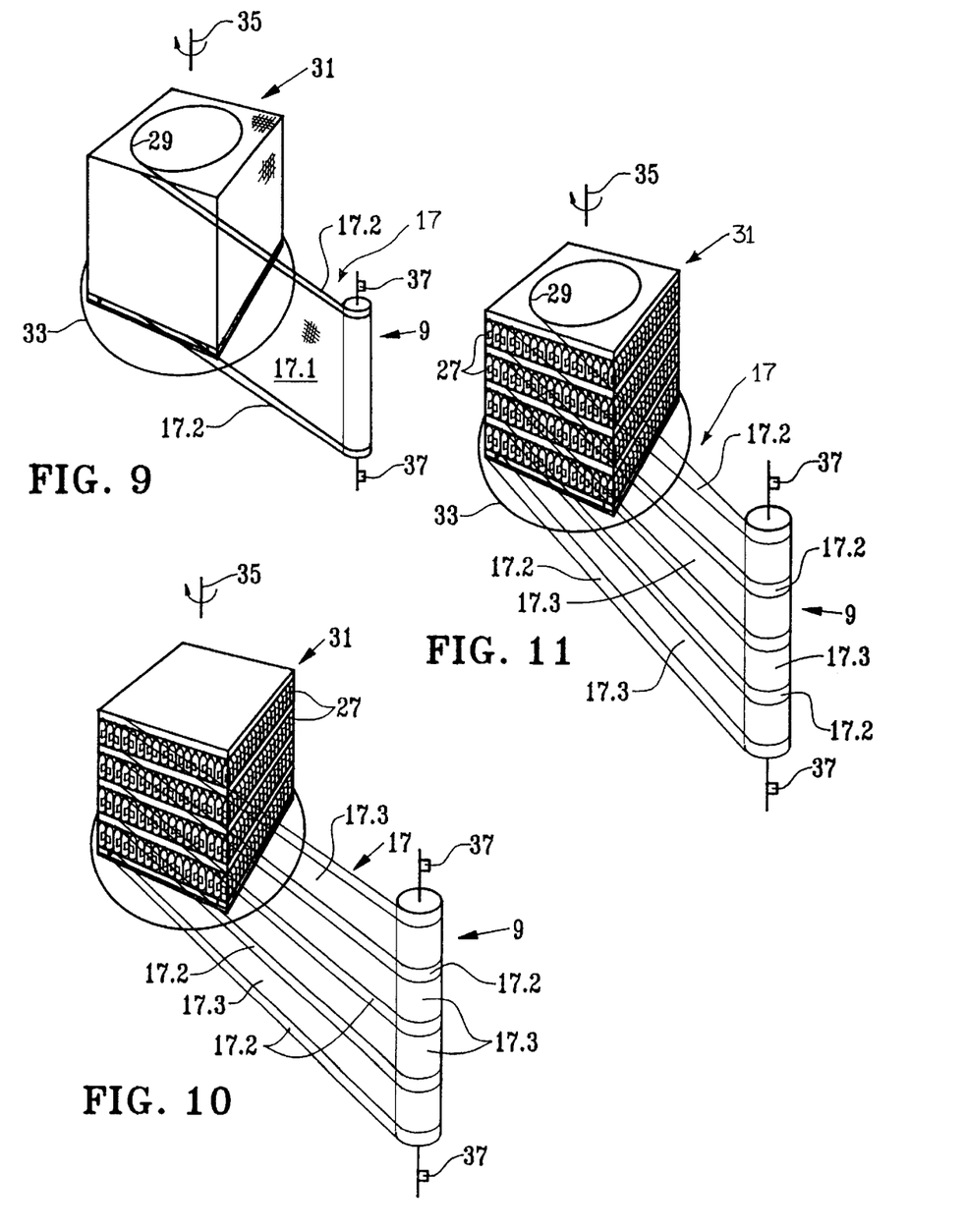
FIG. 9 is a perspective view of a first embodiment of apparatus of the invention for applying outer packaging to a palletized load.
FIG. 10 is a perspective view of a second embodiment of apparatus of the invention for applying outer packaging to a palletized load.
FIG. 11 is a perspective view of a third embodiment of apparatus of the invention for applying outer packaging to a palletized load.

FIG. 9 shows a first example of how outer packaging is applied to a palletized load 31 substantially forming a rectangular parallelepiped.

Advantageously, the width of the zone 17.1 of the film is substantially equal to the height of the palletized load 31, including the pallet. The overlapping zones 17.2 of the film fold under and over to hold the load together and to form openings 29. Naturally, it is possible to place a cap, not shown, on the palletized load before placing the film 17 around the palletized load. Initially the end of the film is secured to one of the vertical faces of the palletized load by using a film that is slightly sticky, or adhesive, or heat sealing, or stapling, or a clamp that is left in place during winding of the film, or any other means, and then one or more layers of film 17 are wound around the palletized load 31. In the non-limiting example shown, the load 31 rests on a turntable 33 that rotates about an axis 35. Rotation of the load 31 unwinds the film 17 from the spool 9, and brake means 37 acting on the spool 9 ensures that the desired tension is obtained. Advantageously, the speed of rotation of the turntable 33 varies periodically throughout each revolution, or in a variant, conventional film transport servo-control means are used, such as for example, of the jumping roller and/or accumulator type so as to cause the film payout speed to vary as a function of the shape of the pallet, so that the linear speed of film payout from the reel 9 is constant regardless of the location of the load which is being covered; since the center of a vertical face is relatively closer to the axis 35 it requires a large angular speed while an edge that is further away from the axis requires a smaller angular speed.

FIG. 10 shows outer packaging on a palletized load 31, for example stacks of beverage bottles 27, comprising a film 17 having highly stretched zones 17.3 of a width lying in the range of 10 cm to 20 cm, for example, providing protection to the load 31, and less stretched longitudinal zones 17.2 of a width suitable for forming strips that ensure cohesion of the palletized load after the outer packaging has been put into place. Advantageously, the number of zones 17.2 corresponds to the number of layers of bottles 27.

For bottles having a height of 33 cm, the width of the less-stretched longitudinal zone 17.2 may lie, for example, in the range of 1 cm to 15 cm, preferably in the range of 1 cm to 10 cm, advantageously in the range of 5 cm to 10 cm, and is preferably equal to 8 cm.

In a first embodiment, the zones 17.3 are completely continuous and provide sealed protection to the palletized load. In a variant, the roller 7 may be provided with spikes, not shown that perforate the zones 17.3 during stretching.

In a variant, it is possible to stretch a film that includes (prior to stretching) macroperforations, e.g. having a diameter of 1 cm. It is then advantageous to perform stretching at high speed, preferably greater than 50 meters per second (m/s) so as to prevent the perforations or macroperforations propagating in the film. Perforations enable the palletized load to be aired and prevent water from condensing on the inside face of the outer packaging film 17.

Figures 12, 13:
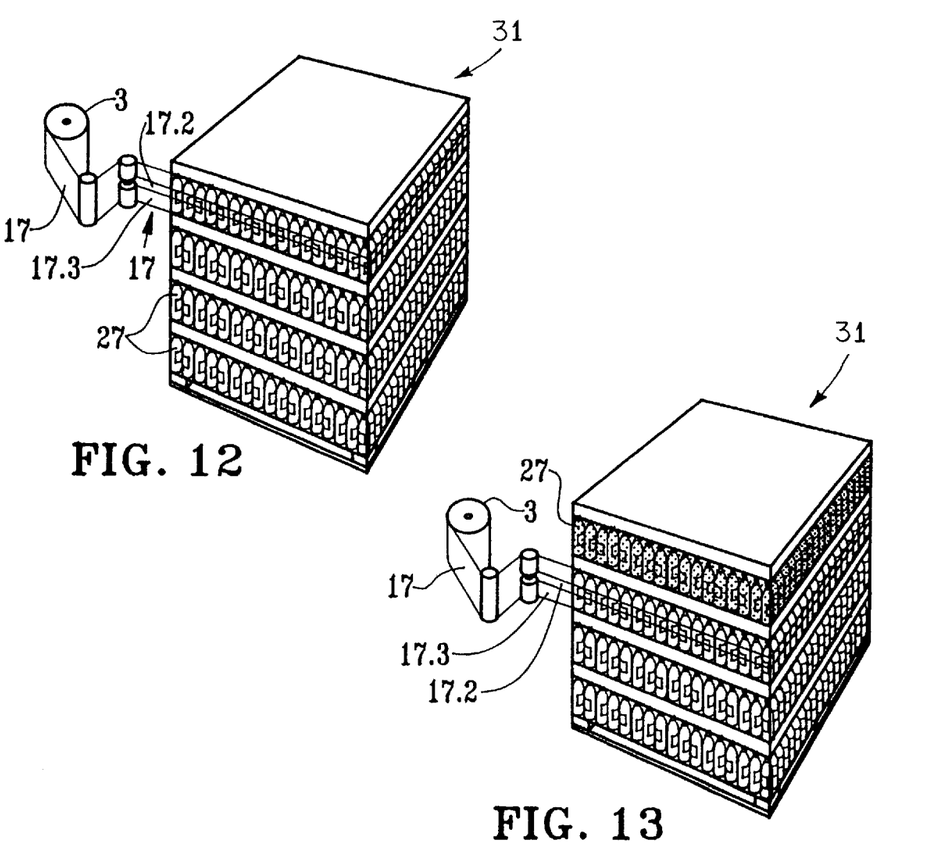
FIGS. 12 and 13 are two perspective views showing two successive steps in applying outer packaging to a load by means of the invention.

FIG. 11 shows a palletized load 31 analogous to that of FIG. 10 receiving outer packaging, and differing from FIG. 10 in that zones 17.2 are also put into place beneath the pallet and on top of the load. It should naturally be understood that using a film 17 of a width that is significantly less than the height of the palletized load 31 would not go beyond the ambit of the present invention. In FIG. 12, a first strip of film 17 is put into place around a first layer of the palletized load 31. Then, as shown in FIG. 13, the next strip is put into place around the layer beneath, or above and so on until the entire palletized load has received outer packaging. In a non-limiting example of FIGS. 12 and 13, the film 17 is stretched simultaneously while it is being put into place on the palletized load 31, but it should be understood that it would also be possible to use pre-stretched film of a width that is less than the height of the palletized load without going beyond the ambit of the present invention. Pre-stretching can involve a great length of film with considerable relaxation or complete stabilization of the film prior to it being put into place, or on the contrary the pre-stretching may apply to a length of film that corresponds to putting outer packaging on a single load, or a few loads with the film relaxing partially only between being stretched and put into place.

Figures 14, 15:
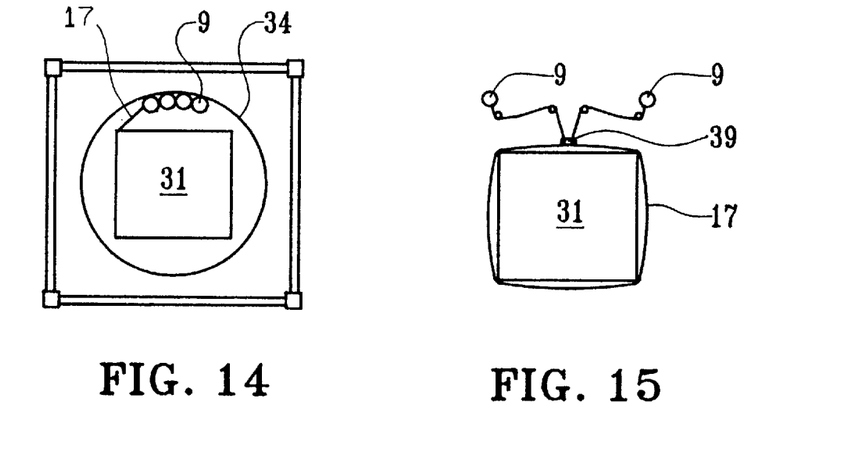
FIG. 14 is a diagrammatic plan view of a fourth embodiment of apparatus of the invention for applying outer packaging to a palletized load.
FIG. 15 is a diagrammatic plan view of a fifth embodiment of apparatus of the invention for applying outer packaging to a palletized load.

Similarly, the present invention is not limited to being implemented on load-carrying turntables 33, but is equally applicable to rotary ring apparatus 34 as shown in FIG. 14 and to curtain apparatus as shown in FIG. 15. The rotary ring apparatus of FIG. 14 may be provided with a reel 9 of height substantially equal to the height of the palletized load corresponding to the examples of FIGS. 9 to 11, or with a reel of film of width that is less than the height of the palletized load 31 and corresponding to FIGS. 12 and 13. The curtain apparatus of FIG. 17 has two reels 9 disposed symmetrically and advantageously provided with film of width substantially equal to the height of the palletized load. Once the load has been surrounded by the film 17, a device 39 heat seals and cuts off the film from the two reels 9.

Differential stretching of the invention makes it possible, firstly, to adjust the shape of the outer packaging to the shape which is to be imparted to the packaged load, usually corresponding to the shape of the goods forming the load, and secondly to distribute the elastic forces exerted by the packaging film in an optimum manner for ensuring cohesion of the load. In addition, the zones which have been stretched most, and which are therefore tensioned least, have greater resistance to rubbing, tearing, and perforation.

The present invention is particularly applicable to applying outer packaging on and grouping together loads whether they are palletized or not.

The present invention applies mainly to grouping together bottles of beverage.

Obviously, many modifications and variations of the present invention are possible in light of the above teachings. It is therefore to be understood that within the scope of the appended claims, the present invention may be practiced otherwise than as specifically described herein.

We claim:

1. Apparatus for stretching a stretchable film, having a longitudinal extent, in a longitudinal direction corresponding to said longitudinal extent of said stretchable film, comprising:

drive means;

a first rotary rollers;

means interconnecting said drive means and said first rotary roller so as to rotate said first rotary roller at a first tangential peripheral speed;

a second rotary roller spaced from said first rotary roller along said longitudinal direction; and means interconnecting said drive means and said second rotary roller so as to rotate said second rotary roller at a second tangential peripheral speed which is greater than said first tangential peripheral speed of said first rotary roller, wherein the diameter of said second rotary roller varies along its axis of rotation so as to form laterally spaced, longitudinally extending zones within said film, routed about said first and second rotary rollers, which exhibit different degrees of longitudinal stretch which correspond to different regions of said film which exert different stretch and tension forces.

2. Apparatus according to claim 1, wherein:

said axial variation in said diameter of said second rotary roller is such as to induce an elongation ratio, of the most stretched longitudinal zone of said film with respect to the least stretched longitudinal zone of said film, which is within the range of 1.1 to 2.

3. The apparatus as set forth in claim 2, wherein:

said stretch ratio is preferably within the range of 1.3 to 1.6.

4. The apparatus as set forth in claim 3, wherein:

said stretch ratio is substantially equal to 1.5.

5. The apparatus as set forth in claim 1, wherein said second rotary roller comprises:

at least one cylindrical portion having a predetermined diametrical extent; and at least one truncated conical portion integrally disposed upon one end of said at least one cylindrical portion.

6. The apparatus as set forth in claim 5, wherein said second rotary roller comprises:

a pair of truncated conical portions integrally disposed upon opposite ends of said at least one cylindrical portion.

7. The apparatus as set forth in claim 1, wherein said second rotary roller comprises:

a plurality of cylindrical portions having predetermined diametrical extents; and a plurality of truncated conical portions interconnecting said plurality of cylindrical portions.

8. The apparatus as set forth in claim 7, wherein:

said plurality of cylindrical portions comprises a plurality of first cylindrical portions having a first diametrical extent, and a plurality of second cylindrical portions having a second diametrical extent which is different from said first diametrical extent of said plurality of first cylindrical portions; and said plurality of truncated conical portions are interposed between respective ones of said first and second cylindrical portions so as to smoothly interconnect said plurality of first and second cylindrical portions.

9. The apparatus as set forth in claim 8, wherein:

said plurality of first cylindrical portions, said plurality of second cylindrical portions, and said plurality of truncated conical portions comprise separable elements; and means for interconnecting said separable elements comprising said plurality of first cylindrical portions, said plurality of second cylindrical portions, and said plurality of truncated conical portions, are provided so as to form said second rotary roller having a predetermined external configuration.

10. Apparatus for stretching a stretchable film, having a longitudinal extent and a lateral width, in a longitudinal direction corresponding to said longitudinal extent of said stretchable film so as to provide said stretchable film with different zones of longitudinal stretch, comprising:

means for conducting said stretchable film along a path extending in said longitudinal direction; and a single stretching roller, having different diametrical portions disposed along its axial length, disposed at a predetermined location along said path and in contact with at least one surface of said stretchable film so as to provide said stretchable film with laterally spaced, longitudinally extending zones which exhibit different degrees of longitudinal stretch which correspond to different regions of said stretchable film which exert different stretch and tension forces.

11. The apparatus as set forth in claim 10, wherein:

said different diametrical portions of said single stretching roller are such as to induce an elongation ratio, of the most stretched longitudinal zone of said stretchable film with respect to the least stretched longitudinal zone of said stretchable film, which is within the range of 1.1 to 2.

12. The apparatus as set forth in claim 10, wherein said single stretching roller comprises:

at least one cylindrical portion having a predetermined diametrical extent; and at least one truncated conical portion integrally disposed upon one end of said at least one cylindrical portion.

13. The apparatus as set forth in claim 12, wherein said single stretching roller comprises:

a pair of truncated conical portions integrally disposed upon opposite ends of said at least one cylindrical portion.

14. The apparatus as set forth in claim 10, wherein said single stretching roller comprises:

a plurality of cylindrical portions having predetermined diametrical extents; and a plurality of truncated conical portions interconnecting said plurality of cylindrical portions.

15. The apparatus as set forth in claim 14, wherein:

said plurality of cylindrical portions comprises a plurality of first cylindrical portions having a first diametrical extent, and a plurality of second cylindrical portions having a second diametrical extent which is different from said first diametrical extent of said plurality of first cylindrical portions; and said plurality of truncated conical portions are interposed between respective ones of said first and second cylindrical portions so as to smoothly interconnect said plurality of first and second cylindrical portions.

16. The apparatus as set forth in claim 15, wherein:

said plurality of first cylindrical portions, said plurality of second cylindrical portions, and said plurality of truncated conical portions comprise separable elements; and means for interconnecting said separable elements comprising said plurality of first cylindrical portions, said plurality of second cylindrical portions, and said plurality of truncated conical portions, are provided so as to form said single stretching roller having a predetermined external configuration.

17. Apparatus for packaging an object with stretchable film, wherein the stretchable film has a longitudinal extent and a lateral width, comprising:

means for conducting said stretchable film along a path extending in a longitudinal direction which extends parallel to said longitudinal extent of said stretchable film;

a single stretching roller, having different diametrical portions disposed along its axial length, disposed at a predetermined location along said path and in contact with at least one surface of said stretchable film so as to provide said stretchable film with laterally spaced, longitudinally extending zones which exhibit different degrees of longitudinal stretch which correspond to different regions of said stretchable film which are to be disposed about different regions of an object so as to permit said different regions of said stretchable film to exert different forces upon different regions of an object; and means for wrapping said stretchable film about an object to be packaged.

18. The apparatus as set forth in claim 17, wherein:

said different diametrical portions of said single stretching roller are such as to induce an elongation ratio, of the most stretched longitudinal zone of said stretchable film with respect to the least stretched longitudinal zone of said stretchable film, which is within the range of 1.1 to 2.

19. The apparatus as set forth in claim 17, wherein said single stretching roller comprises:

at least one cylindrical portion having a predetermined diametrical extent; and at least one truncated conical portion integrally disposed upon one end of said at least one cylindrical portion.

20. The apparatus as set forth in claim 19, wherein said single stretching roller comprises:

a pair of truncated conical portions integrally disposed upon opposite ends of said at least one cylindrical portion.

21. The apparatus as set forth in claim 17, wherein said single stretching roller comprises:

a plurality of cylindrical portions having predetermined diametrical extents; and a plurality of truncated conical portions interconnecting said plurality of cylindrical portions.

22. The apparatus as set forth in claim 21, wherein:

said plurality of cylindrical portions comprises a plurality of first cylindrical portions having a first diametrical extent, and a plurality of second cylindrical portions having a second diametrical extent which is different from said first diametrical extent of said plurality of first cylindrical portions; and said plurality of truncated conical portions are interposed between respective ones of said first and second cylindrical portions so as to smoothly interconnect said plurality of first and second cylindrical portions.

23. The apparatus as set forth in claim 22, wherein:

said plurality of first cylindrical portions, said plurality of second cylindrical portions, and said plurality of truncated conical portions comprise separable elements; and means for interconnecting said separable elements comprising said plurality of first cylindrical portions, said plurality of second cylindrical portions, and said plurality of truncated conical portions, are provided so as to form said single stretching roller having a predetermined external configuration.

* * * * *